United States Patent Office 3,316,200
Patented Apr. 25, 1967

3,316,200
STABLE DISPERSIONS
Robert J. Hatala, St. Petersburg, Fla., assignor to E. I. du Pont de Nemours and Company, Wilmington, Del., a corporation of Delaware
No Drawing. Filed Aug. 6, 1964, Ser. No. 387,983
21 Claims. (Cl. 260—29.6)

This invention concerns aqueous paint vehicles and paints, especially aqueous dispersions of film-forming interpolymers useful as paint vehicles which have excellent freeze-thaw tolerance and mechanical shear stability over an extended pH range.

Aqueous dispersions of interpolymers useful as paint vehicles are characteristically susceptible to coagulation when subjected to freezing and thawing or mechanical shear. A recently developed aqueous dispersion which comprises a non-ionic surfactant and an interpolymer made up of one monomer capable of forming soft homopolymers, one monomer capable of forming hard homopolymers, and a polymerizable monocarboxylic acid, has good mechanical shear stability and freeze-thaw tolerance only within a pH of 8 to 10.

According to this invention, there is provided a film-forming aqueous dispersion suitable for use in preparing paints, which dispersion is freeze-thaw tolerant and shear stable over the pH range of about 2 to 12, and also contains an unusually low concentration of anionic surfactant. This dispersion contains a vinyl addition polymer and preferably an acrylic polymer (a polymer containing acrylic acid and/or acrylic ester units) which consists essentially of (A) monomer units of primary or secondary alkyl acrylates in which the alkyl group has from 1 to 18 carbon atoms, or primary or secondary alkyl methacrylates in which the alkyl group has from 5 to 18 carbon atoms, (B) monomer units of alkyl methacrylates in which the alkyl group has been from 1 to 4 carbon atoms, tert-pentyl methacrylate, tert-butyl acrylate, tert-phenyl acrylate, cyclohexyl acrylate, cyclohexyl methacrylate, acrylonitrile, methacrylonitrile, styrene or vinyl acetate. The weight proportion of (A) units to (B) units being from about 13:1 to about 1:20, and (C) about 0.1% to 10% by weight based on total interpolymer weight of ionogenic units of acids having a pKa value up to about 4.2 and having at least one polymerizable vinyl group or water soluble salts of said acids.

The dispersion of this invention can be used to form protective clear coatings on cellulosics, such as wood; metals, especially iron, steel, copper, and aluminum; and other substrates, such as concrete products. These coatings have many desirable properties including minimal sensitivity to water and detergents, good scrub resistance, good aging and weatherability, and good continuity and flexibility.

Excellent adhesion of films formed from dispersions of this invention to various substrates results from the usefulness of these dispersions over a broad pH range. Especially useful is the high adhesion of films formed from a neutral dispersion of this invention to cellulosic substrates. Films formed from dispersions of this invention having higher pH values generally have improved adhesion to concrete products, while dispersions having a lower pH are useful in forming films on substrates which have an affinity for acidic compounds or in applications where an acidic material is essential. The stability and freeze-thaw tolerance of the aqueous dispersions of this invention over a broad pH range makes the dispersions useful as film-forming compositions for a wide variety of conditions.

Monomers useable as the (A) units of the interpolymers of this invention are those which are capable of forming soft homopolymers while monomers useable as the (B) units of the invention are those capable of forming hard homopolymers. The softness or hardness of these homopolymers is determined by plotting the modulus of rigidity of the homopolymer against temperature and locating the inflection temperature. Homopolymers having an inflection temperature below 15° C. to 20° C. are classified as soft homopolymers while homopolymers with inflection temperatures above 15° C. to 20° C. are classified as hard homopolymers for purposes of this invention. A convenient method for determining inflection temperatures is described by Williamson in British Plastics, 23: 87–90, 102 (September 1950). The inflection values used for classifying the (A) and (B) monomers of the interpolymers of this invention are those determined by the Williamson procedure at 300 kg./cm.$^2$.

Typical (A) monomers coming within the above definitions and limits are methyl acrylate, ethyl acrylate, propyl acrylate, isopropyl acrylate, butyl acrylate, isobutyl acrylate, sec-butyl acrylate, pentyl acrylate, isopentyl acrylate, hexyl acrylate, heptyl acrylate, 2-ethylhexyl acrylate, octyl acrylate, decyl acrylate, dodecyl acrylate, tetradecyl acrylate, octadecyl acrylate, n-pentyl methacrylate, sec-pentyl methacrylate, hexyl methacrylate, 2-ethylhexyl methacrylate, octyl methacrylate, decyl methacrylate, dodecyl methacrylate, octadecyl methacrylate, etc. The preferred (A) monomers are the alkyl acrylates in which the alkyl group has from 2 to 12 carbon atoms, because these monomers combine with the (B) and (C) monomers of this invention to form interpolymer dispersions having the best stability and free-thaw tolerance.

Typical (B) monomers useable in the interpolymers of this invention in addition to those enumerated above are methyl methacrylate, ethyl methacrylate, propyl methacrylate, isopropyl methacrylate, butyl methacrylate, isobutyl methacrylate, sec-butyl methacrylate, and tert-butyl methacrylate. The preferred (B) monomers for the interpolymers of this invention are acrylonitrile and methyl methacrylate which form the most stable dispersions when interpolymerized with the (A) and (C) monomers of this invention.

Final film properties, especially brittleness, adhesion and continuity, and to a lesser extent dispersion properties of shear stability and freeze-thaw tolerance depend on the proportion of (A) monomer to (B) monomer in the dispersion of this invention and on the relative softness and hardness of the individual (A) and (B) monomers. Interpolymers of 0.1% to 10% by weight of the (C) ionogenic monomers and the following proportions of (A) and (B) monomers have a generally useful balance of properties: ethyl acrylate-methyl methacrylate, 3:2 to 7:3; ethyl acrylate-acrylonitrile, 4:1 to 3:1; propyl acrylate-acrylonitrile, 7:3 to 3:1; isopropyl acrylate-acrylonitrile, 9:1 to 5:1; isopropyl acrylate-methyl methacrylate, 6:1 to 4:1; propyl acrylate-methyl methacrylate, 1:1 to 2:3; butyl acrylate-methyl methacrylate, 4:1 to 1.67:1; butyl acrylate-acrylonitrile, 7:3 to 1:2; isobutyl acrylate - methyl methacrylate, 4:1 to 1.61:1; isobutyl acrylate-acrylonitrile. 4:1 to 7:3; pentyl acrylate-methyl methacrylate, 4:1 to 1.2:1; hexyl acrylate-methyl methacrylate, 4:1 to 1.2:1; 2-ethylhexyl acrylate-methyl methacrylate, 2:1 to 1.2:1; 2-ethylhexyl acrylate-acrylonitrile, 2:1 to 3:2; ethyl acrylate-butyl methacrylate, 1:2.3 to 1:4.5; butyl acrylate-butyl methacrylate, 1:2.3 to 1:6; 2-ethylhexyl acrylate-butyl methacrylate, 1:3 to 1:6; n-hexyl methacrylate-$C_1$ to $C_4$ alkyl methacrylates, 13:1 to 2:1; etc. In general, best final film properties are obtained from the dispersions of this invention in which the proportion of (A) monomer to (B) monomer in the interpolymer is within the range of 6:1 to 1:3.

The pKa values of the (C) ionogenic units of the dispersions of this invention are negative logarithms of the dissociation constants (Ka) of these ionogens and are measures of acid strength. Acids having pKa values up to about 4.2 are strong acids useable in the dispersions of this invention. Dissociation constants used in this specification are measured at 25° C. by the conductometric method described by J. F. J. Dippy in Chemical Reviews, 25, 151, 159 (1939).

The quantity of (C) ionogenic units can be about 0.1–10%, but is preferably between 1% to 3% by weight based on interpolymer weight, because the best combination of dispersion freeze-thaw tolerance and mechanical stability and final film properties are produced within this preferred range.

Typical (C) ionogenic units useful in forming the interpolymer dispersions of this invention are sulfoarylethylene acids and alkali metal, alkali earth metal, and ammonium salts of sulfoarylethylene acids, such as styrene sulfonic acid, sodium styrene sulfonate, potassium styrene sulfonate, calcium stryene sulfonate, etc. The ethylene or vinyl group of these acids and salts can be in either the ortho, meta, or para position in relation to the sulfonate group. The aromatic nucleus of these sulfoaryl acids and salts can be substituted with alkyl, alkoxy, halogen, and other radicals in addition to the essential vinyl and sulfonate radicals, forming, for example, 2-methyl-4-vinyl, 3-methyl-4-vinyl, 2-methyl-5-vinyl, 3,5-dimethyl-6-vinyl, 2,3,5-trimethyl-4-vinyl, 2-ethyl-4-vinyl and 2-propyl-4-vinyl benzene sulfonic acids, benzene sulfonic alkali metal salts, and benzene sulfonic alkali earth metal salts. The ortho, meta, and para styrene sulfonic acids have a pKa of about 0.1 which is not significantly changed by these substitutions.

Vinyl naphthalene sulfonic acid and its water-soluble salts, such as the alkali, alkali earth metal, or ammonium salts are also useful as (C) ionogenic units for the interpolymers dispersions of this invention. The vinyl group can be at any position on the rings and the other positions of the rings can be substituted with alkyl, alkoxy, halogen and other radicals similar to the substitutions of the vinyl sulfonic acids above, for example, 2-vinyl naphthalene sulfonic acid, 3-vinyl naphthalene sulfonic acid, 5-vinyl naphthalene sulfonic acid, 2-methyl-6-vinyl naphthalene sulfonic acid, 3-ethyl-6-vinyl naphthalene sulfonic acid, 6-ethyl-7-vinyl naphthalene sulfonic acid, etc. The pKa values of these vinyl naphthalene sulfonic acids and substituted versions thereof is about 0.5. Sodium alkyl sulfonate can also be used.

Other typical (C) ionogenic units are ortho, meta, and para-vinyl benzoic acids each of which has a pKa value of about 4.15, substituted versions of these acids, and alkali metal, alkali earth metal, and ammonium and preferably morpholine salts thereof.

Small amounts usually up to 4% by weight based on interpolymer weight, of methacrylic acid or acrylic acid units can be included in the interpolymer to improve dispersion stability and final film water softening properties, but these units are not essential to the stable aqueous dispersions of this invention.

Anionic surfactants useful in the dispersions of this invention are surface active agents having unsymmetrical molecules containing water-ionizable hydrophilic groups and hydrophobic groups. A negative-charge is imparted to the hydrophobic or anionic group by the ionization. Typical useful anionic surfactants include long chain hydrocarbon derivatives, such as water soluble alkali metal and ammonium salts of half esters of sulfuric acid with long chain fatty alcohols, high alkyl sulfonates, such as sulfonates of coconut oil, high hydroxyalkyl sulfonates, such as sulfonates of oleic acid or castor oil, high alkyl aryl sulfonates, such as dodecylbenzene sulfonates, alkali and alkali earth metal salts of these sulfonates and of fatty alcohol sulfates, such as sodium lauryl sulfate, etc. Other useful anionic surfactants are described and identified by trade names by McCutcheon, J. W., Synthetic Detergents, New York: Mac Nair-Dorland Company, 1950. The preferred anionic surfactant for the dispersion of this invention is sodium lauryl sulfate. Usually surfactant quantities of about 0.1% to 1% by weight based on interpolymer weight are used although the quantity can vary from about 0.1% to about 12% by weight on this basis. The quantity of surfactant usually used in the dispersions of this invention is considerably less than the quantity of non-ionic surfactant used in most commercial prior art dispersions.

Adjustments of the pH of the dispersions of this invention can be made by adding an aqueous solution of a basic material, such as ammonia or an alkali hydroxide. Water-soluble organic bases, such as ethanolamine, diethanolamine, triethanolamine, diethylethanolamine, propanolamine, morpholine, etc., can also be used. Volatile alkaline materials are usually preferred.

Freeze-thaw tolerance of the aqueous dispersions of this invention is determined by subjecting the dispersions to repeated cycles of freezing and thawing until coagulation occurs. The cycle used for determining freeze-thaw tolerance of the dispersions of this invention is 16 hours at $-10°$ C. followed by 8 hours at $+25°$ C. Survival of a minimum of five freeze-thaw cycles is generally considered essential for a commercially acceptable dispersion, although dispersions of lower freeze-thaw tolerance have been marketed, usually for special applications or warm geographic areas. The freeze-thaw stability of aqueous dispersions generally increase with increasing pH, reaching a maximum at about pH 9. Most of the prior art dispersions have commercially acceptable freeze-thaw tolerance only within a narrow pH range centering around this maximum.

Most of the dispersions of this invention which are made up of interpolymers of the preferred monomers will withstand at least five freeze-thaw cycles at a dispersion pH ranging from 2 to 12, and the remaining dispersions have commercial freeze-thaw tolerance over narrow pH ranges.

Mechanical shear stability is another stability requirement of aqueous dispersions of the type of this invention and is determined by measuring the length of time a dispersion of specified pH and temperature will endure without coagulating when subjected to a high shear gradient. The dispersions of the present invention were evaluated for shear stability in a Couette concentric cylinder viscometer at a shear gradient of $10^5$ sec.$^{-1}$, a temperature of 20° C., and a pH of 8.5. The shear stability of dispersions of the present invention is generally from 25% to over 300% higher than most commercial prior art dispersions. Table I presents freeze-thaw tolerance and shear stability values of some of the dispersions of this invention and compares properties of commercial prior art dispersions.

The amount of interpolymer in the aqueous medium can range as high as 75% by weight. The preferred range is 40 to 55%. Freeze-thaw tolerance and mechanical shear stability are not appreciably affected by the proportion of interpolymer to aqueous medium.

Any of the ordinary water insoluble inorganic and organic paint pigments can be used with these dispersions. Titanium dioxide is preferred as the white pigment. Other useful white pigments include zinc oxide, leaded zinc oxide, zinc sulfide, lead titanate, antimony oxide, zirconium oxide, white lead, etc. Useful colored pigments include carbon black, the various iron oxides, lead chromates, chrome yellow, chrome orange, molybdate orange, chrome green, phthalocyanine blues and greens, etc. Extenders, such as clay, silica, talc, mica, calcium carbonate, calcium silicate, or barium sulfate may also be incorporated. The quantity of pigment is, to some extent, determined by the type of coating desired. Clear coatings can be made from the interpolymer alone. The gloss of a paint is generally inversely proportional to pigment volume concentrations, but is also dependent on pigment particle size. Sealers and special coatings use high pigment volume concentrations. Pigments may be added either by grinding them directly into the dispersion in a colloid mill, or by preparing a paste of the pigment in water with the aid of a dispersing agent and combining this pigment dispersion with the interpolymer dispersion. Such pastes are readily prepared by combining pigments, dispersing agent, and water, and grinding the mixture on any of the commonly used mills. The anionic surfactants disclosed above are the preferred dispersing agents.

Various auxiliary agents, such as are normally used in aqueous base paints, can be added to the dispersions of this invention; these include bodying agents, such as methyl cellulose, deforming agents, such as waxes, humectants, such as water soluble gums, thickeners, such as water soluble polyacrylates, and bactericides or fungicides, such as borax. Polymer extenders, such as styrene-butadiene polymers, can also be used.

When the dispersions of this invention contain a major proportion of acrylonitrile, a small amount of coalescing acid can be added to improve application properties and final film continuity in accordance with the teachings of U.S. Patent 3,032,521. Typical useful coalescing agents are tetramethylene sulfone, cyclic ethylene carbonate, dimethyl formamide, dimethyl acetamide, alkyl monoethers of ethylene glycol or diethylene glycol and diacetone alcohol.

The dispersions of this invention are prepared by normal addition polymerization of the monomers in an aqueous medium. The common catalysts, such as alkali metal and ammonium persulfates, perborates, and percarbonates can be used in the ordinarily specified proportions of 0.01 to 3% of the weight of the polymerization monomers, preferably from 0.05% to 0.5%. A redox system, which enhances the polymerization rate, can be established by selecting a reducing agent, such as sodium metabisulfite as the catalyst activator. The proportion of activator should be from 0.3 to 3 parts per part of peroxidic catalyst. Minute amounts of ferrous ion can be used to activate the redox system, and can be supplied by adding 0.002 part of ferrous ammonium sulfate per part of monomer.

Polymerization is preferably carried out at a temperature between 25° C. and 80° C. Temperature control is usually effected by controlling the rate of addition of the monomer. The pH of the resulting dispersion is usually about 2 to 3 and is adjusted by adding any of the previously disclosed basic compounds.

The following examples illustrate additional details of the preparation of the dispersion of this invention.

*Example 1*

Solutions are made up with the following components. All parts are by weight and all water is deionized.

Solution III monomers:
    Sodium lauryl sulfate _____ 1.75
    Ferrous ammonium sulfate _____ .01
    Water _____ 354.13
Solution II initiator:
    Ammonium persulfate _____ .68
    Water _____ 45.54
Solution III monomers:
    (a) Ethyl acrylate _____ 88.0
        Methyl methacrylate _____ 44.0
        Methacrylic acid _____ 2.1
    (b) Ethyl acrylate _____ 177.7
        Methyl methacrylate _____ 88.23
    (c) Sodium p-styrene sulfonate _____ 4.1
        Water _____ 50.0
Solution IV bisulfite:
    Sodium metabisulfite _____ .58
    Water _____ 7.21

Solution V initiator:
    (a) Ammonium persulfate _____ .17
        Water _____ 3.23
    (b) Ammonium persulfate _____ .17
        Water _____ 6.16

Solution I and ⅓ of Solution IIIa are charged to a reaction kettle which is equipped with stirring means and an inert gas inlet. The reaction is carried out under an atmosphere of an inert gas, such as nitrogen, and stirring is continued throughout the reaction. The mixture is heated at 35° C. Solution IV and Solution Va are added, and in about 5 minutes the temperature will have risen to 50° C. to 60° C. The remainder of Solution IIIa and ⅓ of Solution II are added dropwise while maintaining the temperature at about 60° C. to 75° C. This is followed by dropwise addition of the remaining Solution II and all of Solutions IIIb and IIIc. The temperature is held at about 75° C. for 20 minutes and then Solution Vb is added dropwise over a 3 minute period. The temperature is held at 75° C. for an additional 60 minutes, and the solution is cooled.

The resulting dispersion has a pH of about 2, and contains about 47% solids. Percentages of polymerized monomers in the interpolymer are 32.7% methyl methacrylate, 65.8% ethyl acrylate, 0.5% methacrylic acid, and 1.0% sodium p-styrene sulfonate. The dispersion is capable of withstanding over 5 freeze-thaw cycles throughout a pH range of 2.5 to 8.5, and can withstand 39 minutes of mechanical shear at a shear gradient of $10^5$ sec.$^{-1}$ and a dispersion pH of 8.5. Dispersion pH is adjusted with an aqueous ammonia solution.

Sufficient pigment to provide a pigment volume concentration of 15% is ground directly into this dispersion in a colloid mill to produce a paint.

*Example 2*

The following two solutions are prepared using deionized oxygen-free water. All parts are by weight.

Solution I catalyst:
    Sodium lauryl sulfate _____ 0.5
    Ammonium persulfate _____ 1.00
    Sodium bisulfite _____ .25
    Water _____ 13.75
Solution II monomers:
    Methyl methacrylate _____ 32.7
    Ethyl acrylate _____ 66.3
    Sodium p-styrene sulfonate _____ 1.0
    Water _____ 200.0

The monomer mix is heated to 60° C. in a reaction kettle equipped with stirring means and under an inert gas, such as nitrogen. The catalyst mix is slowly added, keeping the temperature below 65° C. to 75° C., and the mixture is held at 50° C. to 65° C. for about two hours after all the catalyst mix has been added. The resulting dispersion contains about 28% solids and has a pH of about 3.5. Proportions of polymerized monomers in the interpolymer are the same as the starting proportions. Freeze-thaw tolerance and shear stability of this dispersion is shown in Table I.

*Example 3*

Two solutions are prepared with the following constituents. All parts are by weight. Water is deionized and oxygen free.

Solution I catalyst:
    Sodium lauryl sulfate _____ 0.5
    Potassium persulfate _____ 0.3
    Sodium bisulfite _____ 0.1
    Water _____ 4.6
Solution II monomers:
    Acrylonitrile _____ 63.0
    Butyl acrylate _____ 32.0
    p-Vinyl benzoic acid _____ 5.0
    Water _____ 200.0

Solution II is charged to a reaction kettle equipped with stirrer and inert gas inlet. The reaction is carried out under an atmosphere of inert gas and the solution is stirred throughout the reaction. Solution II is heated to 60° C. and Solution I is slowly added keeping the temperature below 75° C. The mixture is then maintained at 50° C. to 65° C. for about two hours. The resulting dispersion contains about 28% solids. Proportions of polymerized monomers in the polymer correspond to the starting proportions. The pH is 3.5 and is adjusted by adding aqueous ammonium hydroxide. Freeze-thaw tolerance and mechanical shear stability of this dispersion is shown in Table I.

*Example 4*

A dispersion was prepared according to Example 3 by substituting 39 parts of methyl methacrylate for the acrylonitrile, and 57 parts of ethyl acrylate for the butyl acrylate. Instead of 5 parts of p-vinyl benzoic acid, 4 parts were used. The proportions of polymerized monomers in the final interpolymer corresponded to the starting proportions. Freeze-thaw tolerance and shear stability of this dispersion is also shown in Table I.

Adhesion of the film formed from this dispersion at pH 7 to a hard maple substrate exceeded the tensile strength of the wood. Titanium dioxide pigment in an amount sufficient to provide a pigment volume concentration of 50% was ground directly into this dispersion by means of a colloid mill to produce a useful house paint having excellent stability.

TABLE I

| Monomers | Concentration, Weight Percent | Surfactant | Mechanical Stability at pH 8.5, Minutes to Fail | Freeze-Thaw Tolerance | |
|---|---|---|---|---|---|
| | | | | Cycles to Fail | pH Range [1] |
| AN/BA/MAA [2] | 63/32/5 | Nonionic (4.7%) | 18 | 1 | 2–7 |
| AN/BA/MAA [2] | 63/32/5 | Nonionic (4.7%) | | 4 | 8–11 |
| AN/BA/MAA | 63/32/4/1 | 0.5% NaLS | 58 | [3] 5 | 2–11 |
| AN/BA/NaSS | 63/32/5 | 0.5% NaLS | 50 | [3] 5 | 2–11 |
| AN/BA/pVBA | 63/32/5 | 0.5% NaLS | 30 | [3] 5 | 7.5–9 |
| MMA/EA/MAA [2] | 39/57/4 | Nonionic (4.7%) | 20 | 2 | 2–3 |
| MMA/EA/MAA [2] | 39/57/4 | Nonionic (4.7%) | | [3] 5 | 9–11 |
| MMA/EA/MMA/NaSS | 39/57/3/1 | 0.5% NaLS | 32 | [3] 5 | 2–11 |
| MMA/EA/NaSS | 39/57/4 | 0.5% NaLS | 36 | [3] 5 | 2–11 |
| MMA/EA/pVBA | 39/57/4 | 0.5% NaLS | 35 | 5 | 7–9 |
| MMA/EA/MMA [2] | 32.7/65.8/1.5 | Nonionic (4.7%) | 16 | 2–3 | 7 |
| MMA/EA/MAA [2] | 32.7/65.8/1.5 | Nonionic (4.7%) | | 5 | 8.5 |
| MMA/EA/MAA/NaSS | 32.7/65.8/1.0/0.5 | 0.4% NaLS | 20 | 3–4 | 7 |
| MMA/EA/MAA/NaSS | 32.7/65.8/1.0/0.5 | 0.4% NaLS | | [3] 5 | 8.5 |
| MMA/EA/MAA/NaSS | 32.7/65.8/0.5/1.0 | 0.4% NaLS | 39 | [3] 5 | 2.5–8.5 |
| MMA/EA/NaSS | 32.7/66.3/1.0 | 0.4% NaLS | 38 | 5 | 7 |

[1] Dispersion has listed freeze-thaw tolerance throughout listed pH range.
[2] Commercial prior art dispersions.
[3] Over.
Monomer Key.—AN, Acrylonitrile; MMA, Methyl methacrylate; BA, Butyl Acrylate; NaSS, Sodium p-styrene sulfonate; EA, Ethyl Acrylate; pVBA, p-vinyl benzoic acid; MAA, Methacrylic acid; NaLS, Sodium Lauryl Sulfate.

What is claimed is:

1. An aqueous dispersion which comprises a water insoluble interpolymer and an anionic surfactant, said interpolymer consisting essentially of:
   (A) monomer units selected from the group consisting of primary alkyl acrylates in which the alkyl group has from 1 to 18 carbon atoms, secondary alkyl acrylates in which the alkyl group has from 1 to 18 carbon atoms, primary alkyl methacrylates in which the alkyl group has from 5 to 18 carbon atoms, and secondary alkyl methacrylates in which the alkyl group has from 5 to 18 carbon atoms;
   (B) monomer units selected from the group consisting of alkyl methacrylates in which the alkyl group has from 1 to 4 carbon atoms, tert-pentyl methacrylate, tert-butyl acrylate, tert-pentyl acrylate, cyclohexyl acrylate, cyclohexyl methacrylate, acrylonitrile and methacrylonitrile, styrene and vinyl acetate, the weight proportions of (A) units to (B) units being from 13:1 to 1:20; and
   (C) about 0.1 to 10% by weight based on total interpolymer weight of ionogenic units of acid monomers selected from the group consisting of acids having a pKa value up to about 4.2 and having at least one polymerizable vinyl group and water soluble salts of said acids, said anionic surfactant being in an amount of from 0.1% to 12% by weight based on total weight of interpolymer.

2. The dispersion of claim 1 in which the (C) units are sodium styrene sulfonate.

3. The dispersion of claim 2 in which the (B) units are methyl methacrylate.

4. The dispersion of claim 3 in which the (A) units are ethyl acrylate.

5. The dispersion of claim 3 in which the (A) units are butyl acrylate.

6. The dispersion of claim 4 in which the surfactant is sodium lauryl sulfate.

7. The dispersion of claim 5 in which the surfactant is sodium lauryl sulfate.

8. The dispersion of claim 4 in which the interpolymer also contains units of an acid selected from acrylic acid and methacrylic acid in an amount up to 4% by weight based on total interpolymer weight.

9. The dispersion of claim 2 in which the (B) units are acrylonitrile.

10. The dispersion of claim 9 in which the (A) units are butyl acrylate.

11. The dispersion of claim 10 in which the surfactant is sodium lauryl sulfate.

12. The dispersion of claim 1 in which the (C) units are vinyl benzoic acid.

13. The dispersion of claim 12 in which the (B) monomer is methyl methacrylate.

14. The dispersion of claim 13 in which the (A) monomer is ethyl acrylate.

15. The dispersion of claim 1 in which the (B) units are methyl methacrylate.

16. The dispersion of claim 1 in which the (A) units are ethyl acrylate.

17. The dispersion of claim 1 in which the interpolymer also contains units of methacrylic acid in an amount up to 4% by weight based on total interpolymer weight.

18. The dispersion of claim 1 in which the anionic surfactant is sodium lauryl sulfate.

19. The dispersion of claim 1 in which the quantity of the (C) units is about 1–3% by weight based on total interpolymer weight and the proportion of (A) monomer to (B) monomer is from 6:1 to 1:3.

20. The dispersion of claim 1 in which the (B) units are styrene.

21. The dispersion of claim 1 in which the (B) units are vinyl acetate.

References Cited by the Examiner
UNITED STATES PATENTS

| | | | |
|---|---|---|---|
| 2,601,256 | 6/1952 | Bruson | 260—79.3 |
| 2,753,318 | 6/1956 | Maeder | 260—29.6 |
| 2,837,501 | 6/1958 | Millhiser | 260—79.3 |
| 3,010,929 | 11/1961 | Jones | 260—79.3 |
| 3,067,161 | 12/1962 | Roth | 260—79.3 |

References Cited by the Applicant
UNITED STATES PATENTS

| | | |
|---|---|---|
| 2,300,920 | 11/1942 | Heuer. |
| 2,527,300 | 10/1950 | Dudley. |
| 2,795,564 | 6/1957 | Conn et al. |
| 3,032,521 | 4/1962 | Sanderson. |
| 3,123,589 | 3/1964 | Vanderkooi et al. |

SAMUEL H. BLECH, *Primary Examiner.*

J. ZIEGLER, *Assistant Examiner.*

UNITED STATES PATENT OFFICE
CERTIFICATE OF CORRECTION

Patent No. 3,316,200  April 25, 1967

Robert J. Hatala

It is hereby certified that error appears in the above numbered patent requiring correction and that the said Letters Patent should read as corrected below.

Column 2, line 33, for "free-thaw" read -- freeze-thaw --; line 60, for "1.61:1" read -- 1.67:1 --; column 3, line 33, for "pKa of about 0.1" read -- pKa of about 0.7 --; column 5, line 58, for "Solution III monomers" read -- Solution I surfactant-redox activator --.

Signed and sealed this 28th day of November 1967.

(SEAL)

Attest:

Edward M. Fletcher, Jr.
Attesting Officer

EDWARD J. BRENNER
Commissioner of Patents